J. TEDELL.
CLUTCH MECHANISM FOR SEED PLANTERS.
APPLICATION FILED NOV. 8, 1915.
1,208,696.
Patented Dec. 12, 1916.
2 SHEETS—SHEET 1.
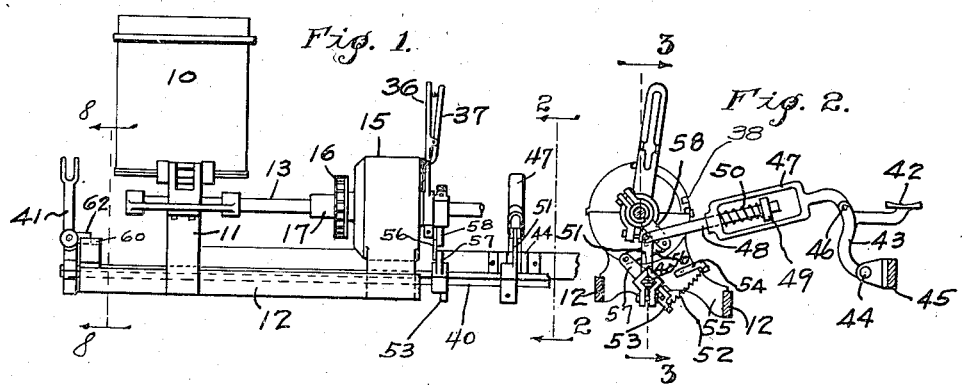
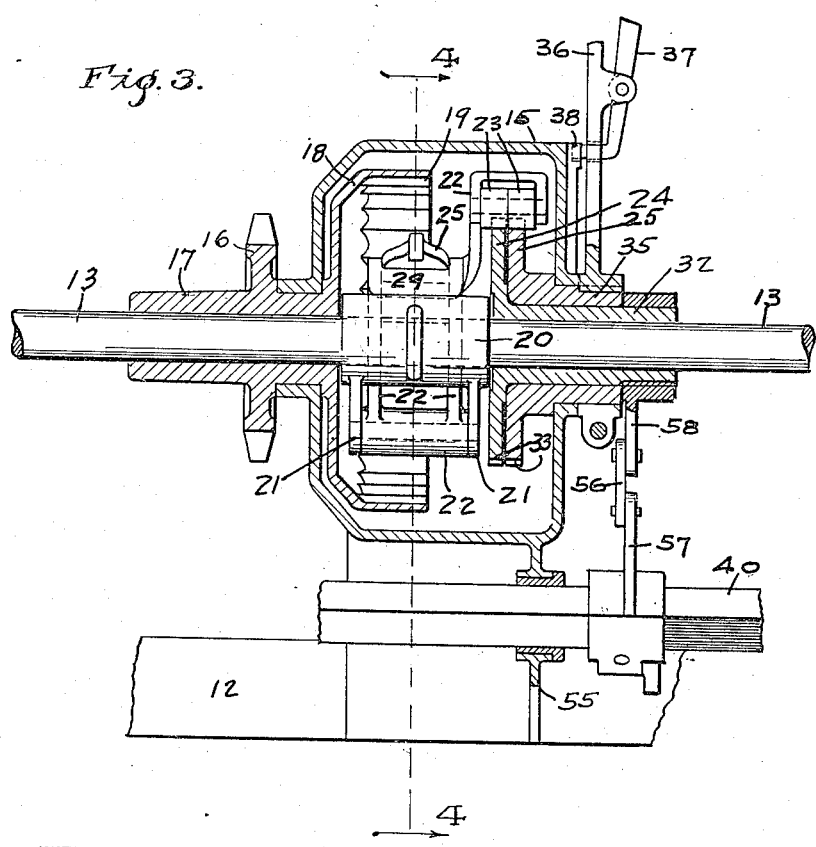
WITNESSES:
INVENTOR
John Tedell
BY
Lockwood & Lockwood
ATTORNEYS J. TEDELL.
CLUTCH MECHANISM FOR SEED PLANTERS.
APPLICATION FILED NOV. 8, 1915.
1,208,696.
Patented Dec. 12, 1916.
2 SHEETS—SHEET 2.
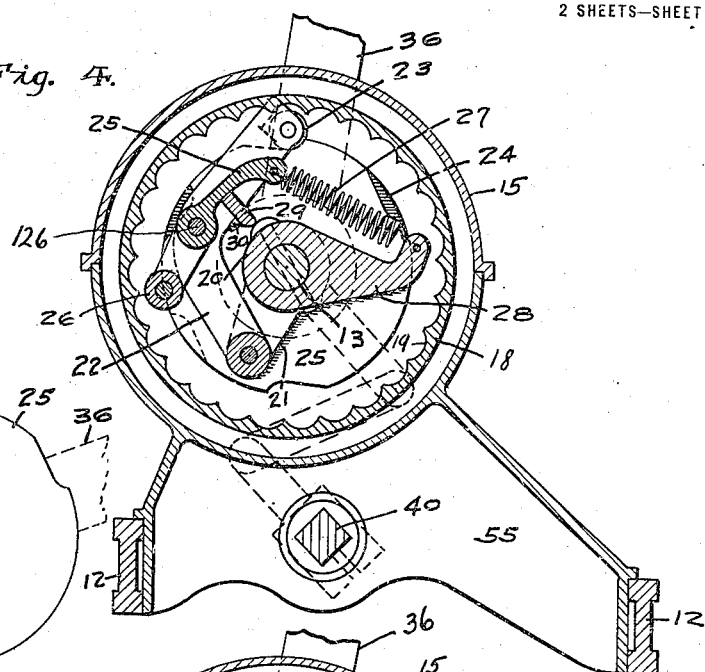
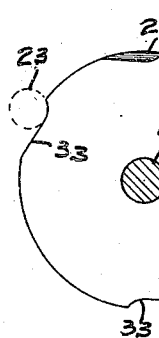
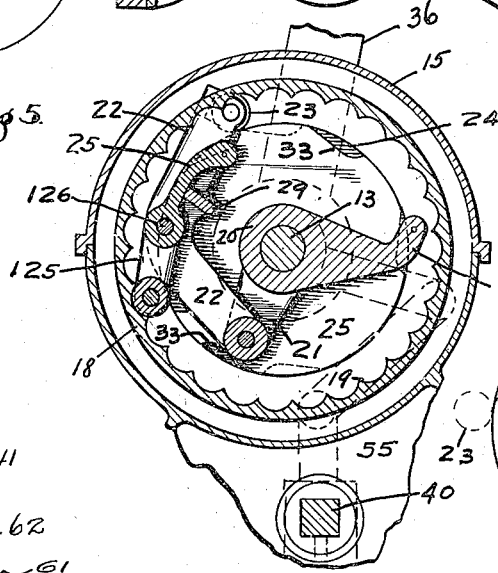
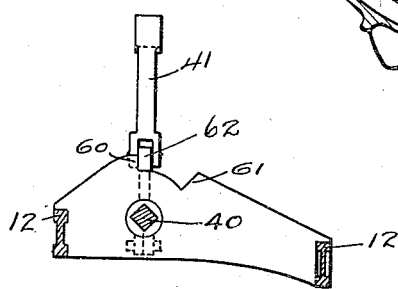
WITNESSES:
INVENTOR
John Tedell
BY
Lockwood & Lockwood
ATTORNEYS

UNITED STATES PATENT OFFICE.

JOHN TEDELL, OF MOLINE, ILLINOIS.

CLUTCH MECHANISM FOR SEED-PLANTERS.

1,208,696.  Specification of Letters Patent.  Patented Dec. 12, 1916.

Application filed November 8, 1915. Serial No. 60,266.

*To all whom it may concern:*

Be it known that I, JOHN TEDELL, a citizen of the United States, and a resident of Moline, county of Rock Island, and State of Illinois, have invented a certain new and useful Clutch Mechanism for Seed-Planters; and I do hereby declare that the following is a full, clear, and exact description thereof, reference being had to the accompanying drawings, in which like letters refer to like parts.

The object of this invention is the control of mechanism in a corn or seed planter, while the machine is traveling and without stopping the same, or the operation of the planter, so that it will drill the seed or grain or drop different numbers of grains at intervals, as desired. With this invention it is unnecessary to stop the planter in order to change it from a dropper to a drill, or the reverse, or in order to change it from a three grain drop to a five grain drop or the like.

Another feature of the invention is to provide a planter with very simple and accurately operating mechanism for controlling the drilling and dropping of the seed and improving the means for controlling the operation of the same.

One feature of the invention consists in providing a clutch for controlling the operation of the drill shaft which has a lever for adjusting it in different positions to cause the machine to drill or drop three grains or five grains, as desired, which lever can be operated by the operator of the machine while the planter is traveling and without the necessity of stopping the machine or making any adjustments requiring time. Associated with said clutch mechanism which is adapted to be operated by hand, there is pedal mechanism for holding the rock shaft constantly in position so that the machine will drill instead of drop. By releasing said pedal mechanism and rock shaft, the machine will drop instead of drill. Therefore, this machine can be converted by pedal movement from a drill to a dropper or the reverse, and by hand movement the dropping can be changed from one number of grains to another number of grains, as desired. This gives to the machine universal application and the changes can be made instantly and without stopping the machine or making adjustments.

Another feature of the invention consists in a clutch mechanism for regulating the operation of the drill shaft, and a housing therefor, with the parts so arranged that the clutch mechanism can be entirely inclosed within the housing and, therefore, be protected from dust and from dirt and yet be adjusted and operated effectively from the outside of the housing. To that end the members of said clutch mechanism or drill shaft control mechanism have portions extending out of the housing whereby they are actuated, adjusted or controlled without opening the housing.

The full nature of the invention will be understood from the accompanying drawings and the following description and claims.

In the drawings, Figure 1 is a front elevation of a portion of a corn planter. Fig. 2 is a section on the line 2—2 of Fig. 1, omitting the seed box. Fig. 3 is a section on the line 3—3 of Fig. 2, on a larger scale. Fig. 4 is a section on the line 4—4 of Fig. 3, with parts broken away and showing the device in position to drop, say, five grains of corn at a time whenever the rock shaft is actuated. Fig. 5 is the same as Fig. 4 with the parts in actuated position, and parts removed. Fig. 6 is a side elevation of the pawl regulating cam disks with other parts shown in dotted lines, said cam disks being in position to cause said machine to drop three grains or the like every time the rock shaft is actuated. Fig. 7 is the same as Fig. 6 showing the cams in their position when the rock shaft is actuated. Fig. 8 is a section on the line 8—8 of Fig. 1.

There is shown in Fig. 1 the left-hand portion of the front part of an ordinary corn planter, with the invention associated therewith. The invention is not limited in its use to any particular style or type of seed planter. There is a seed box 10 mounted on a support 11 to the left side of the corn planter, said support being mounted on a transverse frame 12. There is a drill shaft 13 mounted on the support 11 and provided with means not here detailed for coöperating with the seed box for the purpose of feeding the seed or corn from the box 10 with regularity. At the right-hand side of the machine there is another seed box mounted, not shown in Fig. 1, and the same drill shaft 13 operates the feed mechanism for both seed boxes. Therefore, the drill shaft 13 extends transversely across the front of the machine and it extends through a clutch housing 15 which is supported on the frame 12 at a point between the seed boxes.

As seen in Fig. 3, a sprocket wheel 16 is loosely mounted on the drill shaft outside the housing 15, being integral with a sleeve 17 which extends through the housing and serves as a bearing for the drill shaft in the left-hand side of the housing and within the housing carries a clutch member 18. This clutch member is in the form of a wheel with an internal ratchet 19. The teeth of said ratchet are not sharp, but slope at each side gradually and concavely. A sleeve 20 is secured rigidly on the drill shaft within the housing 15 and from it two parallel radial arms 21 extend which serve as bearings for a pawl carrying lever 22 which is curved and extends substantially concentrically with the drill shaft and on its free end carries a roller 23 which rides on the two cam disks 24 and 25, hereafter explained. A pawl 25 is fulcrumed on a pin 126 about midway its length, as shown in Fig. 4. One end of said pawl has a roller 26 adapted to engage at times the ratchet 19. The other end of said pawl has a spiral spring 27 connected with it at one end and the other end of said spring is connected with an arm 28 rigidly secured on the sleeve 20, as seen in Fig. 4. Said spring tends to hold the pawl against a stop 30, and the roller 23 against the cams 24 and 25, thereby normally holding the roller 26 out of engagement with the ratchet 19, as shown in Fig. 4. When said lever 22 is in its inner position, as in Fig. 4, the pawl cannot engage the ratchet because an arm 29 on the pawl engages a stop 30 on the lever 22, as seen in Fig. 4. The spring 27 always holds the arm 29 of the pawl against the stop 30 and thus the pawl is in position to engage the ratchet whenever the lever 22 is moved outward by cams 24 and 25 to permit such engagement. When the parts are, therefore, in the position shown in Fig. 4, the driving sprocket wheel idles and does not drive the drill shaft. When the parts are in the position shown in Fig. 5, they drive the drill shaft.

The drill shaft is driven by power being transmitted from the wheel 19 through the pawl 25 when held in engagement with the ratchet by disks 24 and 25. Cam disk 24 is, as shown in Fig. 3, secured on a sleeve 32 which extends outside of the housing and furnishes a bearing also for the drill shaft. This disk has in its periphery four notches 33 adapted to register with four corresponding notches in the disk 25. The roller 23 on the pawl 25 always rides on the peripheries of the two disks 24 and 25 and when two notches in the disks correspond and the roller drops into them, the pawl will not engage the ratchet and, therefore, the drill shaft will not be driven. When, however, there is no registry of the notches in the two disks, as shown in Fig. 7, the roller 23 will be held by said disks farther from their center so as to force the pawl in engagement with the ratchet and as the roller travels around said disks the drill shaft will be driven constantly. Therefore, the function of the cam disks is to hold the pawl in actuating engagement with the ratchet so as to drive the drill shaft, or when two notches in said two disks register, permits the pawl to disengage the ratchet and not transmit power to the drill shaft.

The cam disk 25 is mounted on a sleeve 35 surrounding the sleeve 32 and extending outside the housing, said two disks being adjacent each other. Said cam disk 25 is adjusted in position by a hand lever 36 which is secured to the sleeve 35 outside the housing and extends upwardly and rearwardly so as to be conveniently reached and operated by the operator while riding on the machine, and a latch 37 locks said lever in adjusted position by engaging notches 38 in the side of the housing. In the machine here shown said lever is moved to only two positions, one, as shown in Figs. 4 and 5, during which the machine will drop a large number of grains, say, five at each time, and the other shown by dotted lines in Figs. 6 and 7, in which positions of the lever the machine will drop a fewer number of grains, say, three at each time. The reason for this will appear hereafter.

The disk 24 is oscillated by a rock shaft 40 which extends transversely across the machine and is mounted in connection with the frame 12 and has at each extreme right and left end a check fork 41 secured in the usual way and in position to be actuated by a chain stretched across the field, as is common in corn planters. The check fork and chain is required when the machine operates as a dropper.

The rock shaft is also in this machine actuated by a pedal 42 which is in convenient position for the operator sitting on the planter. The pedal is on a lever 43 fulcrumed at 44 to a frame piece 45 of the machine and pivotally connected at 46 with a hollow member 47 through which a plunger rod 48 extends and has a nut 49 on the other end thereof and between the nut and the end of the frame 47 a spiral spring 50 is located. The plunger 48 is pivotally connected with an arm 51 secured to and extending upward from the rock shaft. The result is that when the pedal is depressed, it will rock backward and throw the rock shaft arm 51 backward and rock the rock shaft in the same way and to the same extent as the check fork 41 when it is actuated by a notch in the chain. However, by keeping the foot pressed down on the pedal 42 the rock shaft will be maintained in such actuated position and in such position the machine will drill constantly and will operate as a drill whether the check forks 41 are in use or not. A spring 52 is connected to an arm 53 from the rock shaft and to a bar 54 on the frame 55 which supports the housing on the frame bars 12. Said spring returns the rock shaft to its normal position after each actuation, whether that actuation be by the pedal mechanism or by the check fork and chain.

Power is transmitted from the rock shaft to the sleeve 32 of disk 24 by means of a link 56 connecting an arm 57 on the rock shaft and an arm 58 secured to the sleeve 32. The idle position of these parts is shown in Fig. 4, and the actuated position of the rock shaft and its connection is shown in Fig. 5 by dotted lines. The rocking movement of the rock shaft is limited by the stops 60 and 61 and an arm 62 connected with the rock shaft for engaging said stops. The spring 52 holds the arm 62 normally against the stop 61, but when the rock shaft is actuated either by the chain, not shown, operating the check fork 41, or by operating the pedal 42, stop 60 limits the movement of said rock shaft. The cam disk 25 is so secured in relation to the rock shaft and means intermediate said shaft and disk that when the arm 62 lies against stop 61 and thus holds the rock shaft in its forward limit of oscillatory movement, the cam notches 33 on said disk 25 are in position to register with one or more of the notches in the disk 24, as will hereafter appear, but when the rock shaft is oscillated rearward, either by the jack fork or the pedal 42, so that the arm 62 lines against stop 60, no notch 33 in disk 25 will register with any notch in disk 24, as shown in Fig. 5; and therefore, while the rock shaft is in that position, the disks will hold the pawl 22 in engagement with the ratchet and cause the operation of the drill shaft. When the rock shaft is kept in this latter position constantly, the machine will drill constantly, that is, it will drop the grains one at a time as they come from the feeding mechanism in the seed box and during one entire revolution of the rock shaft or clutch mechanism, a number of grains, say, ten will be dropped, one at a time. During this time the disks 24 and 25 are stationary and in the position shown in Fig. 7, so that the roller 26 travels smoothly around their peripheries.

When it is desired to drop at one time, say, five grains, the hand lever 36 is set in the position shown in Fig. 4, and then when the rock shaft is in its normal position, the two opposite notches 33 of each disk will register with the corresponding notches in the other disk, as shown in Fig. 4. That will permit the roller 23 of the pawl 25 to rest in one pair of the registry notches, say the upper pair, as shown in Fig. 4, and thereby the pawl 24 be held out of engagement with the ratchet until a notch on the chain, not shown, actuates the check fork rearward and oscillates the rock shaft back to the stop 61. That turns disk 25 so that its notches do not register with any of the notches in disk 24 for the time being. Then the pawl is thrown into engagement with the ratchet and the drill shaft is actuated and five grains or half the total number of grains which had accumulated in the lower part of the seed box will be dropped and almost instantly the check fork will be released and the spring will throw it back to its normal position, bringing the upper and lower notches 33 again into registry with the two disks and when the lower set of said notches are reached by the roller 23 this operation will be repeated. Hence, there will be, say, five grains dropped at each half revolution of the rock shaft.

If it be desired to drop, say, three grains, or less, instead of more at a time, the hand lever 36 is set in position shown by dotted lines in Fig. 6. That changes the relation of the disk 24 and disk 25 and brings their opposite notches 33 into registry three times during each revolution of the pawl 25 instead of twice, as before, and thus at each operation and one-third revolution of the rock shaft one-third of the total number of grains, say, three grains, will be dropped.

The invention is not limited to any particular number of cam notches 33 in disks 24 and 25, as they could be changed so as to drop any other number of grains, as has been explained.

The invention claimed is:

1. A seed planter including a shaft, a closed housing in which the shaft is mounted, and clutch mechanism within said housing for controlling the operation of said shaft, the members of said clutching mechanism having portions thereof extending outwardly through the housing concentric with the shaft so as to be externally operated and adjusted without opening the housing.

2. A seed planter including a shaft, a closed housing in which the shaft is mounted, clutch mechanism within said housing for controlling the operation of said shaft, sleeves for carrying members of said clutch mechanism which project outward through the housing concentric with the shaft, and means engaging said sleeves outside the housing for operating and adjusting the same.

3. A seed planter including a shaft, a closed housing in which the shaft is mounted, clutch mechanism within said housing for controlling the operation of said shaft, sleeves on which members of said clutch mechanism are mounted which extend outwardly through the housing and furnish bearings for the shaft, and means engaging said sleeves outside the housing for operating and adjusting the same.

4. A seed planter including a shaft, a clutch member loosely mounted on said shaft and having a ratchet thereon, means for constantly driving said clutch member, a member rigidly mounted on the shaft, a lever fulcrumed at one end of said member, a pawl mounted on said lever in position to engage the ratchet, stops on said lever and pawl in position to engage each other, a spring connected with the inner end of said pawl for holding said stops in engagement and also withdrawing said lever and pawl both inward so that the pawl will not engage the ratchet, and means operable while the machine is in operation for moving the free end of said lever so as to bring the pawl into engagement with the ratchet and thus transmit power to the shaft.

5. A seed planter including a shaft, a constantly driven clutch member loosely mounted thereon, adjustable engaging means operably mounted on said shaft in position to be moved into or out of engagement with said constantly driven clutch member, a cam disk with a notched periphery around which said adjustable clutch member travels, another cam disk beside said first cam disk and of the same diameter and having peripheral notches adapted at times to register with the notches on the first disk, and a rock shaft operably connected with one of said disks for oscillating it, the parts being so arranged that before the rock shaft is oscillated the notches in the disks will register and permit the adjustable clutch member to be out of engaging position and when the rock shaft is actuated the disk with which it is connected will be moved so that the notches in the two disks will not register and the peripheries of the disks will hold the adjustable clutch member in actuating position until the rock shaft and the disk which is actuated return to their normal position.

6. A seed planter including a shaft, a constantly driven clutch member loosely mounted thereon, adjustable engaging means operably mounted on said shaft in position to be moved into or out of engagement with said constantly driven clutch member, a cam disk with a notched periphery around which said adjustable clutch member travels, another cam disk beside said first cam disk and of the same diameter and having peripheral notches adapted at times to register with the notches on the first disk, and means for permanently holding said adjustable means in actuated position so that the clutch will constantly operate.

7. A seed planter including a shaft, a constantly driven clutch member loosely mounted thereon, adjustable engaging means operably mounted on said shaft in position to be moved into or out of engagement with said constantly driven clutch member, a cam disk with a notched periphery around which said adjustable clutch member travels, another cam disk beside said first cam disk, a lever for adjusting said cam disk, and a rock shaft operably connected with said first mentioned disk for oscillating it, the parts being so arranged that before the rock shaft is oscillated the notches in the disk will register and permit the adjustable clutch member to be out of engaging position and when the rock shaft is actuated the disk with which it is connected will be moved so that the notches in the two disks will not register and the peripheries of the disks will hold the adjustable clutch member in actuating position until the rock shaft and the disk which it actuated return to their normal position.

8. A seed planter including a shaft, a clutch member loosely mounted thereon and having an internal ratchet, means for constantly driving the clutch member, a member secured on the shaft, a pawl mechanism mounted on said member in position for the pawl to engage the ratchet, a pair of disks around the peripheries of which said pawl mechanism is adapted to travel, said disks having notches in their peripheries adapted at times to register with each other and when registering to permit the pawl to move out of actuating engagement with said ratchet, a lever for adjusting one of said cam disks, a rock shaft, and a connection between the rock shaft and the other cam disk for oscillating it to move it so that its notches will not register with the notches in the other cam disk while in such position and thereby hold the pawl mechanism in actuating engagement.

9. A seed planter including a shaft, a clutch member loosely mounted thereon and having an internal ratchet, means for operating said clutch member, a member mounted on the shaft, a lever pivoted at one end on said member, a roller on the other end of said lever, a pawl pivoted between its ends on said lever with one end adapted to engage the ratchet, a spring pulling the other end of the pawl inward, stops on said lever and pawl for limiting the action of the spring, a pair of cam disks on which the roller on the end of said lever travels, said disks having notches in their peripheries adapted at times to register with each other and when registering to permit the pawl to move out of actuating engagement with said ratchet, a lever for adjusting one of said cam disks, a rock shaft, and a connection between the rock shaft and the other cam disk for oscillating it to move it so that its notches will not register with the notches in the other cam disk while in such position and thereby hold the pawl mechanism in actuating engagement.

10. A seed planter including a shaft, a constantly driven clutch member loosely mounted thereon, adjustable engaging means operably mounted on said shaft in position to be moved into or out of engagement with said constantly driven clutch member, a cam disk with a notched periphery around which said adjustable clutch member travels, another cam disk beside said adjustable cam disk and of the same diameter and having peripheral notches adapted to register at times with the notches on the adjustable disk, the notches of said two disks being arranged so that when said last-mentioned disk is in one position, its notches will fail to register with all of the notches in the other disk and when in another position there will be two oppositely located pairs of registered notches in said disk and when still in another position there will be three equi-distant pairs of registering notches in said disks.

11. A seed planter including a shaft, a constantly driven clutch member loosely mounted thereon, adjustable engaging means operably mounted on said shaft in position to be moved into or out of engagement with said constantly driven clutch member, a cam disk with a notched periphery around which said adjustable clutch member travels, another cam disk beside said adjustable cam disk and of the same diameter and having peripheral notches adapted to register at times with the notches on the adjustable disk, the notches of said two disks being arranged so that when said last-mentioned disk is in one position, its notches will fail to register with all of the notches in the other disk and when in another position there will be two oppositely located pairs of registered notches in said disk and when still in another position there will be three equi-distant pairs of registering notches in said disks, means for adjusting said last-mentioned disk so as to bring the two pairs or the three pairs of notches into registration as desired, a rock shaft, and a connection with said other disk arranged so that its notches will register when the rock shaft is in normal position but will not register when the rock shaft is in actuating position.

In witness whereof, I have hereunto affixed my signature.

JOHN TEDELL.

Copies of this patent may be obtained for five cents each, by addressing the "Commissioner of Patents, Washington, D. C."